Patented Jan. 23, 1951

2,539,118

UNITED STATES PATENT OFFICE 2,539,118

MANUFACTURE OF CARBURETED WATER GAS

Stephen P. Cauley, Garden City, N. Y., assignor to Socony-Vacuum Oil Company, Incorporated, a corporation of New York No Drawing. Application June 2, 1947, Serial No. 751,979

5 Claims. (Cl. 48—205)

This invention relates to the manufacture of carbureted water gas. More particularly, the invention is concerned with improved gas enrichment oil compositions utilizable in carbureted water gas manufacturing operations.

As is well known, gas for household or industrial purposes is manufactured ordinarily by a process commonly referred to as the carbureted water gas process. In accordance with this process a solid fuel, such as coal or coke, is charged into a chamber known as a generator to form a fuel bed therein. The fuel bed is ignited and its temperature is raised to the point of incandescence by sending a blast of air therethrough. The hot gases produced by the action of the oxygen of the air on the carbon of the fuel bed are withdrawn from the generator and passed successively to a second chamber known as a carbureter and thence through a third chamber called a superheater. By passing the hot gases produced by the air blast through the carbureter and the superheater, these vessels are brought up to operating temperatures, i. e., between about 1200° F. and about 1650° F. for the purposes hereinafter defined.

When the optimum operating temperatures in the carbureter and superheater are obtained, the air blast is discontinued and steam is introduced into the generator. A reaction takes place between the water of the steam and the carbon of the fuel bed to produce what is known as water gas. Normally this water gas is composed of equal parts of carbon monoxide and hydrogen. The heating value of this gas, however, is quite low (usually about 300 B. t. u. per cu. ft.). For this reason and in order that the gas be made suitable for the ordinary household and industrial uses, it is required that the gases be enriched by the addition thereto of suitable hydrocarbon gases. These hydrocarbon gases are derived from the thermal cracking of petroleum oils, known in the art as gas-enriching oils, in the next step in the process. This step is commonly known as the carburetion step.

In the carburetion step, the water gas from the generator is passed into the carbureter where it is brought into intimate contact with the gas enrichment oil which is usually admitted to the carbureter in the form of a spray. The carbureter is packed with suitable sized pieces of ceramic material, such as checker bricks, to provide a large surface area for contacting the oil. The sensible heat of the water gas and the high temperature of the contact surfaces in the carbureter (1200–1650° F.) are sufficient to vaporize the oil. The mixture of water gas and oil vapor then passes through the carbureter, a considerable portion of the vaporized oil being cracked and to some extent polymerized into fixed gases. The reacted mixture is passed from the carbureter up through the superheater. The purpose of the superheater is to provide for additional cracking of the oil whereby additional quantities of gas are produced. The temperature of the contact surfaces in the superheater is carefully regulated so that the decomposition of the oil is carried to the most advantageous point, the resulting mixture being composed of fixed gases, condensible vapors and a small quantity of complex hydrocarbons known as water gas tar.

From the superheater the gases are next passed to a washing zone where they are cooled to about 200° F. The gases are then passed to a scrubber wherein entrained solid matter, water and tar are removed. From the scrubber the gases are passed to a condenser and finally to storage.

When the temperature of the generator falls off to a point where it is no longer efficient for the production of water gas, the stem is shut off and air is again blasted through the system until the desired operating conditions are again obtained.

The carbureted water gas obtained by the process just described normally has a specific gravity of approximately 0.65 and a heating value of about 530–540 B. t. u. per cu. ft. However, it is frequently necessary to produce carbureted water gases having specific gravities which are higher or lower than about 0.65 in order that the manufactured gas may be blended with gases from other sources to meet certain desired specifications. Whenever such an occasion arises, the desired effect is accomplished by separate manufacturing operations not included in the ordinary operating cycle of a carbureted water gas manufacturing plant.

In current carbureted water gas manufacturing operations it is often desirable to produce carbureted water gases having somewhat lower specific gravities than about 0.65 in order that greater quantities of high specific gravity gases, such as butane or propane, may be blended therewith and yet meet specific gravity specifications. Since these latter gases are available in large quantities from petroleum refinery operations, their use enables the production of greatly increased quantities of specified water gas without the necessity of installing additional equipment. Accordingly, any process whereby a carbureted water gas having a relatively low specific gravity is obtained manifestly is of considerable practical importance.

I have now found that the addition of certain types of substances to the hydrocarbon oils injected into the carbureter, i. e., gas-enrichment oils, influences the magnitude of the specific gravity of the hydrocarbon gases produced in the cracking operation, thereby influencing the magnitude of the specific gravity of the carbureted water gas mixture. More particularly, I have discovered that the addition of nitrogen-containing organic compounds, such as quinoline, diphenyl amine, benzyl aniline and phenyl acetonitrile to gas-enrichment oils effects a decrease in the specific gravity of the gases produced, while the addition of elementary sulfur and aliphatic sulfur compounds, such as n-butyl disulfide, increases the specific gravity of the gases produced.

Accordingly, it is a primary object of my invention to provide improved gas-enrichment oil compositions capable of influencing the character of the carbureted water gas obtained therefrom. A more specific object of my invention is to provide improved gas-enrichment oil compositions capable of influencing the magnitude of the specific gravity of carbureted water gas. A still more specific object is to provide gas-enrichment oil compositions capable of decreasing the magnitude of the specific gravity of carbureted water gas. Still another object is to provide an improved process for manufacturing carbureted water gas. Further objects and advantages of my invention will become apparent hereinafter.

The effectiveness of the enrichment-oil additive compounds contemplated herein in influencing the magnitude of the specific gravity of the gases obtained by cracking gas-enrichment oils is illustrated by the data presented in the accompanying table. This table shows the specific gravities of the gases formed by the thermal cracking of residuum oils under identical conditions with and without the addition of the various compounds to the oils.

Table

| Residuum Oil | Comp'd Added | Conc. of N (wgt. per cent) | Conc. of S (wgt. per cent) | Sp. G. of Gas (Air=1) |
| --- | --- | --- | --- | --- |
| A | None | 0.0 | | 1.27 |
| | Quinoline | 0.1 | | 0.87 |
| | do | 0.5 | | 0.80 |
| | Diphenylamine | 0.5 | | 0.75 |
| | Benzylamine | 0.5 | | 1.09 |
| | Phenyl-acetonitrile | 0.5 | | 1.20 |
| B | None | | 0.0 | 1.16 |
| | n-butyl-disulfide | | 1.0 | 1.42 |

From the data given in the table, it will be apparent that the additive compounds contemplated in this invention are capable of markedly effecting the specific gravity of the gases produced by the thermal cracking of gas-enriching oils. Accordingly, the use of these compounds in the manner outlined is considered an important contribution to the art of manufacturing carbureted water gases. The additive agents may be added to the petroleum oils in amounts ranging from 0.05% to about 5% although compositions of the desired improved specific gravity properties are generally obtained by the use of amounts of from about 0.1% to about 2%.

It is to be understood that the principle of my invention is not to be limited to the several embodiments thereof hereinabove described but only as indicated in the appended claims.

I claim:

1. In the process for the manufacture of carbureted water gas comprising the steps of reacting (1) carbon at incandescent heat with steam to form water gas, (2) passing water gas from step 1 and petroleum oil into a chamber maintained at an elevated temperature sufficient to crack said oil to normally gaseous hydrocarbons whereby carbureted water gas is produced and (3) recovering the carbureted water gas from said chamber, the improvement which comprises adding a small proportion of a compound selected from the group consisting of quinoline, diphenylamine, benzyl aniline and phenyl-acetonitrile to the petroleum oil utilized in step 2 whereby the specific gravity of the carbureted water gas obtained is effectively lowered.

2. In the process for the manufacture of carbureted water gas comprising the steps of reacting (1) carbon at incandescent heat with steam to form water gas, (2) passing water gas from step 1 and petroleum oil into a chamber maintained at an elevated temperature sufficient to crack said oil to normally gaseous hydrocarbons whereby carbureted water gas is produced and (3) recovering the carbureted water gas from said chamber, the improvement which comprises adding a small proportion from about 0.05% to about 5% of a compound selected from the group consisting of quinoline, diphenyl-amine, benzyl aniline and phenyl-acetonitrile to the petroleum oil utilized in step 2 whereby the specific gravity of the carbureted water gas obtained is effectively lowered.

3. In the process for the manufacture of carbureted water gas which comprises the steps of (1) reacting carbon at incandescent heat with steam to produce water gas, (2) passing water gas from step 1 and petroleum oil into a chamber maintained at an elevated temperature sufficient to crack said oil to form normally gaseous hydrocarbons, whereby carbureted water gas is produced and (3) recovering the carbureted water gas from said chamber; the improvement which comprises adding to the petroleum oil utilized in step 2 a small proportion of quinoline, whereby a carbureted water gas of decreased specific gravity is obtained.

4. In the process for the manufacture of carbureted water gas which comprises the steps of (1) reacting carbon at incandescent heat with steam to produce water gas, (2) passing water gas from step 1 and petroleum oil into a chamber maintained at an elevated temperature sufficient to crack said oil to form normally gaseous hydrocarbons, whereby carbureted water gas is produced and (3) recovering the carbureted water gas from said chamber; the improving step which comprises adding to the petroleum oil utilized in step 2 a small proportion of diphenyl-amine, whereby a carbureted water gas of decreased specific gravity is obtained.

5. In the process for the manufacture of carbureted water gas which comprises the steps of (1) reacting carbon at incandescent heat with steam to produce water gas, (2) passing water gas from step 1 and petroleum oil into a chamber maintained at an elevated temperature sufficient to crack said oil to form normally gaseous hydrocarbons, whereby carbureted water gas is produced and (3) recovering the carbureted water gas from said chamber; the improving step which comprises adding to the petroleum oil utilized in step 2 a small proportion of benzyl aniline, whereby a carbureted water gas of lowered specific gravity is obtained.

STEPHEN P. CAULEY.

REFERENCES CITED

The following references are of record in the file of this patent:

UNITED STATES PATENTS

| Number | Name | Date |
|---|---|---|
| 1,221,698 | Day | Apr. 3, 1917 |
| 1,762,688 | Hofman | June 10, 1930 |
| 1,768,910 | Ihrig | July 1, 1930 |
| 1,909,069 | Orelup | May 16, 1933 |